United States Patent
Biedermann et al.

(10) Patent No.: US 6,624,284 B1
(45) Date of Patent: Sep. 23, 2003

(54) FIBERPLATES MADE OF POLYAMINES OR POLYAMINE-CONTAINING AMINOPLAST RESINS AS BINDING AGENTS

(75) Inventors: Norbert Biedermann, Bad Dürkheim (DE); Stephan Weinkötz, Lindenberg (DE); Günter Scherr, Ludwigshafen (DE); Franz Wolf, Edenkoben (DE); Gunter Lehmann, Birkenheide (DE); Ralph Lehnen, Reinbek (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 20 days.

(21) Appl. No.: 10/019,442

(22) PCT Filed: Jun. 23, 2000

(86) PCT No.: PCT/EP00/05858

§ 371 (c)(1),
(2), (4) Date: Dec. 31, 2001

(87) PCT Pub. No.: WO01/05891

PCT Pub. Date: Jan. 25, 2001

(30) Foreign Application Priority Data

Jul. 1, 1999 (DE) .......................................... 199 30 525

(51) Int. Cl.⁷ ........................ C08G 12/32; C08G 12/36; C08G 12/38

(52) U.S. Cl. ...................... 528/230; 528/254; 528/256; 524/501; 524/509; 428/502; 428/505

(58) Field of Search ................................. 528/230, 254, 528/256; 524/501, 509; 428/502, 505

(56) References Cited

FOREIGN PATENT DOCUMENTS

EP        0 542 360        5/1993

OTHER PUBLICATIONS

"Fibreboard mfg. method–polyethyleneimine used at molecular mass 20000 and introduced into fibre pulp at pH 7–8" Database WPI, Week 197815 XP002148125.
"Wood fiber plates" Chemical Abstracts, vol. 89, No. 14 abstract No. 113011 Oct. 2, 1978.

*Primary Examiner*—Duc Truong
(74) *Attorney, Agent, or Firm*—Oblon, Spivak, McClelland, Maier & Neustadt, P.C.

(57) ABSTRACT

A process for producing fiberboard panels includes

I. gluing cellulosic fibers with an aqueous glue solution and adjusting the moisture content of the cellulosic fibers and/or the water content of the glue such that the moisture content of the glued cellulosic fibers is not more than 150%; and II. compressing the glued cellulosic fibers produced in step (I) at elevated temperature to fiberboard panels.

19 Claims, No Drawings

FIBERPLATES MADE OF POLYAMINES OR POLYAMINE-CONTAINING AMINOPLAST RESINS AS BINDING AGENTS

This application is a 371 of PCT/EP00/05858 filed Jun. 23, 2000.

The present invention relates to a process for producing fiberboard panels by

I. gluing cellulosic fibers with an aqueous glue solution comprising
 a) for a glue solution (a), an aliphatic polyamine having at least 3 groups selected from the group consisting of primary and secondary amino groups, having a weight average molar weight of from 600 to 1000000 g/mol, and being substantially free from other functional groups apart from tertiary amino groups (polyamine P); or
 b) for a glue solution (b), a mixture of a polyamine P and an amino resin (b) synthesized from
  b1) formaldehyde;
  b2) a compound (b2) selected from the group consisting of urea and melamine, the ratio of the amino groups of compound (b2) to formaldehyde being from 0.4:1 to 3:1;
  b3) and, if desired, up to 0.2 mol per mole formaldehyde of another compound, (b3), capable of reacting with formaldehyde in a polycondensation reaction;
  b4) and, if desired, up to 0.2 mol per mole amino groups of compound (b2) of another compound, (b4), capable of reacting with amino groups in a polycondensation reaction; or
 c) for a glue solution (c), an amino resin (c) synthesized from
  c1) formaldehyde;
  c2) a compound (c2) selected from the group consisting of urea and melamine, the ratio of the amino groups of compound (c2) to formaldehyde being from 0.3:1 to 3.0:1;
  c3) a polyamine P, the molar ratio of the sum of primary, secondary, and tertiary amino groups of polyamine P to the sum of primary amino groups of compound (c2) being from 0.0005:1 to 2:1;
  c4) and, if desired, up to 0.2 mol per mole formaldehyde of another compound, (c4), capable of reacting with formaldehyde in a polycuadensation reaction; and
  c5) if desired, up to 0.2 mol per mole amino groups of compound (c2) of another compound, (c5), capable of reacting with amino groups in a polycondensation reaction;

and adjusting the moisture content of the cellulosic fibers and/or the water content of the glue such that the moisture content of the glued cellulosic fibers is not more than 150%; and II. compressing the glued cellulosic fibers produced in step (I) at elevated temperature to fiberboard panels.

The invention further relates to fiberboard panels produced by this process and to the glue solution (c).

The production of fiberboard panels is common knowledge and is described, for example, in the monograph entitled "MDF—Mitteldichte Faserplatten" by Hans-Joachim Deppe, Kurt Ernst, 1996, DRW-Verlag Weinbrenner GmbH & Co., 70771 Leinfelden-Echterdingen (DE). Fiberboard panels may be produced, for example, by gluing cellulosic fibers with amino resins and then compressing them at elevated temperature. A disadvantage of the fiberboard panels produced in this way is that relatively large quantities of glue are required in order to produce panels having good mechanical properties, particularly a good transverse tensile strength. Moreover, in the predominant number of plants, the cellulosic fibers used must be predried after gluing, since the fibers glued with the conventional binders must have a moisture content of only up to 12% if problems are to be avoided during the production of the panels.

Apart from the fact that they are both woodbase materials, chipboard and fiberboard have little in common. This relates first to the performance properties. The aforementioned monograph by Deppe/Ernst refers explicitly to this, for example, concerning comparison of the performance properties of the two materials (cf. paragraph 1 of section 6.3 and paragraph 1 of chapter 7, "IMDF and chipboard panels differ in performance, in some cases very considerably"). From the aforementioned monograph it is also known that the manufacturing technology of each is also different and that the raw wood material used has different properties and is differently prepared. For example, at the beginning of section 4.1 of the monograph, there is the following note: "In terms of the preparation of the raw material, critical differences exist between chipboard and MDF technologies". And at the beginning of section 4.2 it goes on to say: "Fiber material requires, for its drying, technical equipment which differs fundamentally from the types which are common in the chipboard industry". It is consequently no surprise to the skilled worker that binders for the production of chipboard panels and MDF are not suitable in the same way. Whereas resins comprising polyethyleneimine as sole binder give high-grade MDF (cf. examples 1 to 6) it is virtually impossible to product chipboard panels from the same resin (cf. comparative example 3). The conclusion the skilled worker draws from this is that experience gained in the production and properties of chipboard panels cannot be transferred to MDF.

For the sake of comprehensiveness it should nevertheless be mentioned that DE-A-4308089 discloses producing chipboard panels with a binder comprising an aqueous solution of a polyamine, from 0.01 to 0.25 mol sugar per mole of amino groups, and from 0.01 to 0.25 mol, per mole amino groups, of dicarboxylic acid derivatives, aldehydes or epoxides.

U.S. Pat. No. 3,642,671 proposes producing chipboard panels by resinating wooden chips with a resin comprising polyethyleneimine and dextrose or other dextroselike compounds and compressing them to chipboard panels under elevated temperature and pressure.

Journal of Applied Polymer Science 49 (1993) 229–245 describes how chipboard panels bound with modified urea-formaldehyde resins are found more resistant and more stable in a hot, moist environment than those produced using customary amino resins. Proposed modifiers are low molecular mass polyamines or their hydrochlorides or polyalkylene oxide diamines.

USSR patents 501890, 612819, 844273 and der JP-A S57-95399 disclose MDF produced by the wet process. In this process an aqueous suspension of cellulosic fibers, a polyethyleneimine, and other auxiliaries, with a water fraction of more than 95%, is poured out and predried to mats having water contents of more than 60% (corresponding to fiber moisture contents of 150% based on bone dry fiber). These mats are subsequently compressed to hardboard panels.

The furniture industry has a particular requirement for fiberboard panels which are highly compacted, so that they have good mechanical properties, are from about 6 to 40 mm thick, so that they can be used to produce furniture side pieces or doors, and have a smooth surface on both sides. Panels of this kind are referred to as S2S (smooth two sides) panels (cf. Ullmann's Encyclopedia of Industrial Chemistry, 1996 VCH Verlagsgesellschaft, Vol. A 28, section 2.3.2.1, page 336)

For economic reasons, fiberboard panels having this profile of properties are not produced by the wet process. That process can only be used economically to produce panels of high density with a thickness of up to 5 mm (cf. Ullmann's Encyclopedia of Industrial Chemistry, 1996 VCH Verlagsgesellschaft, Vol. A 28, section 2.3.2.2, page 337, column 1, paragraph 1). The reason for this is that with this process it is not possible using economic pressing conditions to achieve adequate compaction and curing of the middle of the panel. Moreover, the panels produced by the wet process have a rough surface on one side. This is a consequence of the production process: to remove the higher water fraction it is necessary when compressing the fiber molding for one press tool to have a screen structure. The pattern of this screen structure is embossed on one of the sides of the fiber panel. Panels of this kind are known as S1S (smooth one side) panels. This uneven surface is often troublesome in the course of further processing, when coating with decorative paper, for example.

A further disadvantage of the wet process is that it produces large amounts of contaminated wastewater.

It is an object of the present invention to provide fiberboard panels which do not have the abovementioned disadvantages and which are characterized in particular by the following properties: a thickness of from 6 to 40 mm, a density of from 500 to 900 kg/m$^3$, and 2 smooth surfaces.

We have found that this object is achieved by the fiberboard panels defined at the outset, by processes for producing them, and by glue solutions from which such panels can be produced.

Suitable cellulosic fibers include those commonly used to produce MDF. Raw materials of this kind are described, for example, in "MDF—Mitteldichte Faserplatten", Hans-Joachim Deppe, Kurt Ernst, 1996, DRW-Verlag Weinbrenner GmbH & Co., 70771 Leinfelden-Echterdingen, chapter 2, pages 25 ff. Suitable fibers are therefore those of annual plants, wastepaper fiber material, and—preferably—wood fibers.

The wood fibers are usually produced by hydrothermal pulping of woodchips, for example, by treating them with steam and then defibering them using cutting tools (cf. op. cit. section 4.1).

The wood fibers thus obtained normally have an average length of from 0.2 to 5 mm, an average diameter of from 10 to 75 $\mu$m, and an average slenderness of from 40 to 120, the slenderness being calculated from the ratio of length to diameter. These parameters for characterizing the wood fibers are widely known and are described, for example, in "Werkstoffe aus Holz", authors' collective, VEB Fachbuchverlag Leipzig 1975 section 4.2.1.1.

Suitable binders comprise the glue solutions (a), (b) or (c).

The glue solution (a) comprises an aqueous solution of an aliphatic polyamine having at least 3 functional groups selected from the group consisting of primary and secondary amino groups, having a weight average molar weight of from 600 to 1000000 g/mol, and being substantially free from other functional groups apart from tertiary amino groups (polyamine P).

Such solutions normally have a polyamine P solids content of from 20 to 80% by weight. The solids content of this solution, like that of resin solutions (b) and (c), is normally determined by pouring out a defined amount by weight (about 2 g) of the corresponding solution onto a metal drying plate and drying it in a drying oven at 120° C. for 2 hours. The solids content is determined by differential weighing.

As polyamine (P) it is preferred to use polyethyleneimine or polyvinylamine. The polyethyleneimine preferably has a weight-average molar weight of from 800 to 100000 and the polyvinylamine one of from 5000 to 200000.

Suitable binders further include glue solutions (b). These solutions comprise as cocomponents alongside water polyamine (P) and an amino resin (b) synthesized from b1) formaldehyde;

b2) a compound (b2) selected from the group consisting of urea and melamine, the ratio of the amino groups of compound (b2) to formaldehyde being from 0.4:1 to 3:1; and b3) if desired, up to 0.2 mol per mole formaldehyde of another compound, (b3), capable of reacting with formaldehyde in a polycondensation reaction;

b4) and, if desired, up to 0.2 mol per mole amino groups of compound (b2) of another compound, (b4), capable of reacting with amino groups in a polycondensation reaction.

Glue resins (b) of this kind are widely known and are described, for example, in Ullmann's Encyclopedia of Industrial Chemistry, 1996 VCH Verlagsgesellschaft, Vol. A 2, chapter "Amino Resins", page 115 ff.

The compounds (b3) comprise, for example, guanidines, thiourea or alkali metal hydrogen sulfite or alkali metal sulfite.

The compounds (b4) comprise, for example, carboxylic anhydrides, preferably $C_1$ to $C_{10}$ monocarboxylic or dicarboxylic anhydrides, organic halogen compounds such as $C_1$ to $C_{10}$ alkyl halides, isocyanates such as are widely known for preparing polyurethanes, e.g., hexamethylene diisocyanate, aldehydes, especially aliphatic $C_1$ to $C_{10}$ monoaldehydes or dialdehydes such as succinaldehyde or acetaldehyde, chlorohydrins, especially epichlorohydrin, or epoxides derived from these chlorohydrins.

In the glue solution (b) the ratio of polyamine (P) to amino resin (b) is usually from 0.002:1 to 100:1, preferably from 0.01:1 to 5:1.

Normally, glue solutions (b.) having a solids content of from 40 to 70% are used.

The glue solutions (c) comprise amino resins (c) synthesized from:

c1) formaldehyde;

c2) a compound (c2) selected from the group consisting of urea and melamine, the ratio of the amino groups of compound (c2) to formaldehyde being from 0.3:1 to 3.0:1;

c3) a polyamine P, the molar ratio of the sum of primary and secondary amino groups of polyamine P to the sum of primary, secondary, and tertiary amino groups of compound (c2) being from 0.0005:1 to 2:1;

c4) if desired, up to 0.2 mol per mole formaldehyde of another compound, (c4), capable of reacting with formaldehyde in a polycondensation reaction; and c5) and, if desired, up to 0.2 mol per mole amino groups of compound (c2) of another compound, (c5), capable of reacting with amino groups in a polycondensation reaction.

Suitable compounds (c4) are the same as compounds (b3), suitable compounds (c5) the same as compounds (b4).

Apart from the additional use of a polyamine (P), the amino resins (c) are basically prepared exactly the same as the amino resins (b).

The procedure here generally involves in step 1, reacting an aqueous solution of
formaldehyde;
amounts of compound (c2) such that the ratio of the amino groups of compound (c2) to formaldehyde is from 0.1:1 to 2.0:1;
amounts of polyamine (P) such that the molar ratio of the sum of the primary, secondaren and tertiary amino groups of polyamine P to the sum of the primary amino groups of compound (c2) is from 0.0005:1 to 2:1;
if desired, up to 0.2 mol per mole formaldehyde of another compound (c4); and
if desired, in amounts up to 0.2 mol per mole amino groups the compound (c5);

at a pH of from 2.5 to 8.5, preferably from 4.0 to 6.5, and a temperature of from 50 to 100° C. until the solution has a viscosity of from 10 to 2000 mPas, and in step 2, where necessary, raising the pH to from 6 to 9 and, where necessary, adding urea in amounts such as to give the desired molar ratio of components (c1), (c2), (c3) and (c4) in the end product, and continuing to react the reaction mixture at a temperature of from 20 to 100° C. until the solution has a viscosity of from 10 to 2000 mPas.

The viscosity figures relate to samples measured at 20° C. and adjusted to a solids content of 40% by weight prior to measurement.

Where the solids content of the resin solution (c) thus prepared is lower than is desired, it is possible to raise the solids content to levels of from 50 to 80% by distillative removal of water, preferably under reduced pressure, e.g., at pressures of from 1 to 10 mbar.

The glue solutions (a), (b) and (c) may further comprise customary auxiliaries such as water repellents, e.g., paraffins or wood preservatives. Additionally, a curing agent, e.g., a carboxylic acid such as formic acid or an ammonium salt, may be added to the glue solutions immediately before their processing in order to shorten the cure times.

The glue solutions (a), (b) and (c) are applied to the cellulosic fibers by conventional methods (cf. "MDF— Mitteldichte Faserplatten", Hans-Joachim Deppe, Kurt Ernst, 1996, DRW-Verlag Weinbrenner GmbH & Co., 70771 Leinfelden-Echterdingen (DE), section 4.3, pages 81ff.).

A procedure commonly adopted here is to glue cellulosic fibers with a moisture content of from 0 to 120% in a blowline, i.e., by swirling the fibers in a stream of air or steam and spraying in the glue solution or performing gluing by mixing fibers and glue solution in an open pan mixer. The moisture content is defined as the ratio of the difference of the actual weight of the wood and the corresponding weight of bone dry (i.e., absolutely dry) fibers to the weight of bone dry fibers. The weight of the bone dry fibers is determined by drying a defined amount of fibers in a drying oven at 105° C. for 16 hours.

For gluing, the glue solution is used in amounts such that for 100 g of bone dry fibers there are for glue solution (a) from 0.2 to 5 g for glue solution (b) from 0.5 to 15 g of glue equivalents (b), calculated as follows:

$$\text{glue equivalents }(b) = M(b) + 10 \times M(P)$$

where
M(b) denotes the amount of amino resin (b) required to prepare a defined amount of glue solution (b); and
M(P) denotes the amount of polyamine (P) required to prepare a defined amount of glue solution (b)

for glue solution (c) from 1 to 20 g of glue equivalents (c), calculated as follows:

$$\text{glue equivalents }(c) = M(c1) + M(c2) + 10 \times M(c3)$$

where
M(c1) denotes the amount of formaldehyde required to prepare a defined amount of resin solution (c);
M(c2) denotes the amount of compound (c2) for the preparation; and
M(c3) denotes the amount of compound (c3) required to prepare a defined amount of glue solution (c3)

of the corresponding glue solution (a), (b) or (c), based on the solids content.

The amount of glue solution or its solids content and the solids content of the cellulosic fibers are chosen so that the moisture content of the glued cellulosic fibers is not more than 150%, preferably from 2 to 120%.

The glued cellulosic fibers are then compressed to fiberboard panels by a customary method. For this purpose, a fiber mat is produced by scattering the glued cellulosic fibers onto a support and said mat is compressed at temperatures of from 80 to 250° C. under pressures of from 5 to 50 bar to fiberboard panels (cf. op. cit. section 4.5, pages 93 ff).

The glued cellulosic fibers are preferably scattered to give fiber mats of a thickness such that hot compression results in fiberboard panels having a density of from 500 to 900 kg/m$^3$ and a thickness of from 6 to 40 mm, preferably from 10 to 25 mm. The press times required for this are usually from 4 to 20 seconds per mm thickness of the resultant fiberboard panel.

In order to produce fiberboard panels having smooth surfaces, suitable press tools are those having smooth surfaces; e.g., 2 polished steel belts of which one acts as a support for the fiber mat, or a combination of a polished steel belt support and a polished steel roller running over it, or a combination of two or more polished steel rollers.

The resulting fiberboard panels may be processed further in the customary manner and are especially suitable for producing furniture parts.

Experimental Section

Fiberboard panels were produced from different binders. The binders used were aqueous solutions of different polyvinylamines (PVAm) (MW=approx. 1000, 30000, 200000) and different polyethyleneimines (PEI) (MW=approx. 800, 2500, 5000). The properties and precise production conditions may be found in table 1.

TABLE 1

| | Example | | | | | | | | | |
|---|---|---|---|---|---|---|---|---|---|---|
| | 1 | 2 | 3 | 4 | 5 | 6 | 7 | 8 | 1 (C) | 2 (C) |
| Binder | PVAm | PVAm | PVAm | PVAm | PEI | PEI | a) | b) | UF resin | UF resin commercially customary |
| MW [daltons] | 1000 | 11500 | 11500 | 11500 | 200000 | 2500 | 5000 | — | — | |
| pH | 12–13 | 12–13 | 12–13 | 7 | 12–13 | 12–13 | 12–13 | 9 | 9 | 9 |
| Fiber moisture content [%] | 12 | 12 | 20 | 20 | 20 | 12 | 12 | 12 | 12 | 20 |
| Gluing [%] | 1.25 | 1.25 | 1.25 | 1.25 | 1.25 | 1.25 | 1.25 | 3.5 | 3.5 | 3.5 |
| Transverse tensile strength [N/mm$^2$] | 1.17 | 0.99 | 1.37 | 1.30 | 1.03 | 0.64 | 1.18 | 1.12 | 0.46 | no panels |
| Swelling [%] | 71.2 | 59.8 | 47.0 | 28.0 | 40.2 | 85.3 | 66.9 | 57.2 | 80.1 | | a) Blend of a commercial UF resin with PEI (MW = 2500) in a ratio of 90:10 (based on solid resin)
b) Glue solution prepared according to claim 6 from urea, formaldehyde, and polyethyleneimine (PEI): Ratio of urea amino groups to formaldehyde 0.8:1 Molar ratio of sum of amino groups of polyethyleneimine to sum of amino groups of urea = 0.2:1

COMPARATIVE EXAMPLE 3:

Production of Chipboard Panels with PEI MW= 5000

Problem: Panel Remains Sticking to the Press Stage; Torn During Removal

Although it was possible to obtain panels when pressing was carried out using release paper, the panels had a low transverse tensile strength (0.4 N/mm$^2$). In swelling tests, the test specimens fell apart.

PVAm and PEI exhibit the following advantages over conventional UF resin:

reduced glue consumption coupled with better transverse tensile strength and similar or better swelling figures greater moisture tolerance; i.e., in contrast to the case with UV resin, panels can be obtained even at high fiber moisture contents (20%)

We claim:

1. A process for producing a fiberboard panel by
   I. gluing cellulosic fibers with an aqueous glue solution comprising
      a) for a glue solution (a), an aliphatic polyamine having at least 3 groups selected from the group consisting of primary and secondary amino groups, having a weight average molar weight of from 600 to 1000000 g/mol, and being substantially free from other functional groups apart from tertiary amino groups (polyamine P); or
      b) for a glue solution (b), a mixture of a polyamine P and an amino resin (b) synthesized from
         b1) formaldehyde;
         b2) a compound (b2) selected from the group consisting of urea and melamine, the ratio of the amino groups of compound (b2) to formaldehyde being from 0.4:1 to 3:1;
         b3) and, if desired, up to 0.2 mol per mole formaldehyde of another compound, (b3), capable of reacting with formaldehyde in a polycondensation reaction;
         b4) and, if desired, up to 0.2 mol per mole amino groups of compound (b2) of another compound, (b4), capable of reacting with amino groups in a polycondensation reaction; or
      c) for a glue solution (c), an amino resin (c) synthesized from
         c1) formaldehyde;
         c2) a compound (c2) selected from the group consisting of urea and melamine, the ratio of the amino groups of compound (c2) to formaldehyde being from 0.3:1 to 3.0:1;
         c3) a polyamine P, the molar ratio of the sum of primary, secondary, and tertiary amino groups of polyamine P to the sum of primary amino groups of compound (c2) being from 0.0005:1 to 2:1;
         c4) and, if desired, up to 0.2 mol per mole formaldehyde of another compound, (c4), capable of reacting with formaldehyde in a polycondensation reaction;
         c5) and, if desired, up to 0.2 mol per mole amino groups of compound (c2) of another compound, (c5), capable of reacting with amino groups in a polycondensation reaction;
   and adjusting the moisture content of the cellulosic fibers and/or the water content of the glue such that the moisture content of the resinated cellulosic fibers is not more than 150%; and
   II. compressing the glued cellulosic fibers produced in step (I) at elevated temperature to a fiberboard panel.

2. A process as claimed in claim 1, wherein the glue solution is used in amounts such that per 100 g of bone dry cellulosic fibers there are
   for glue solution (a) from 0.2 to 5 g
   for glue solution (b) from 0.5 to 15 g of glue equivalents (b), calculated as follows:

glue equivalents $(b) = M(b) + 10 \times M(P)$ where
   M(b) denotes the amount of amino resin (b) required to prepare a defined amount of glue solution (b); and
   M(P) denotes the amount of polyamine (P) required to prepare a defined amount of glue solution (b)

for resin solution (c) from 1 to 20 g of glue equivalents (c), calculated as follows:

glue equivalents $(c) = M(c1) + M(c2) + 10 \times M(c3)$ where
   M(c1) denotes the amount of formaldehyde required to prepare a defined amount of glue solution (c);
   M(c2) denotes the amount of compound (c2) for the preparation; and
   M(c3) denotes the amount of compound (c3) required to prepare a defined amount of glue solution (c3)
   of the corresponding glue solution (a), (b) or (c), based on the solids content.

3. A process as claimed in claim 1, wherein the polyamine (P) comprises polyethyleneimine or polyvinylamine.

4. A process as claimed in claim 3, wherein the polyethyleneimine has a weight average molar weight of from 800 to 100000 and the polyvinylamine has one of from 5000 to 200000.

5. A process as claimed in claim 1, wherein the ratio of polyamine (P) to amino resin (b) in the glue solution (b) is from 0.002:1 to 100:1.

6. A process as claimed in claim 1, wherein an amino resin (c) is used which is synthesized from
- c1) formaldehyde;
- c2) a compound (c2) selected from the group consisting of urea and melamine, the ratio of the amino groups of compound (c2) to formaldehyde being from 0.3:1 to 3:1;
- c3) a polyamine P, the molar ratio of the sum of primary, secondary, and tertiary amino groups of polyamine P to the sum of primary amino groups of compound (c2) being from 0.0005:1 to 2:1;
- c4) if desired, up to 0.2 mol per mole formaldehyde of another compound, (c4), capable of reacting with formaldehyde in a polycondensation reaction; and
- c5) if desired, up to 0.2 mol per mole amino groups of compound (c2) of another compound, (c5), capable of reacting with amino groups in a polycondensation reaction;

and is obtainable by
- in step 1, reacting an aqueous solution of formaldehyde;
  - amounts of compound (c2) such that the ratio of the amino groups of compound (c2) to formaldehyde is from 0.1:1 to 2.0:1;
  - amounts of polyamine P such that the molar ratio of the sum of the primary, secondary and tertiary amino groups of polyamine P to the sum of the primary amino groups of compound (c2) is from 0.0005:1 to 2:1; and
  - if desired, up to 0.2 mol per mole formaldehyde of another compound (c4),
  - if desired, in amounts up to 0.2 mol per mole amino groups of compound (c2), another compound (c5) at a pH of from 2.5 to 8.5 and a temperature of from 50 to 100° C. until the solution has a viscosity of from 10 to 2000 mPas (measured at 20° C. on a solution having a solids content of 40%), and
- in step 2, where necessary, raising the pH to from 6 to 9 and, where necessary, adding urea in amounts such as to give the desired molar ratio of components (c1), (c2), (c3) and (c4) in the end product, and continuing to react the reaction mixture at a temperature of from 20 to 100° C. until the solution has a viscosity of from 10 to 2000 mPas (measured at 20° C. on a solution having a solids content of 40%).

7. A process as claimed in claim 1, wherein said cellulosic fibers comprise wood fibers, fibers from annual plants or wastepaper fiber material.

8. A process as claimed in claim 7, wherein said wood fibers are those obtainable by hydrothermally pulping woodchips and then defibering them.

9. A process as claimed in claim 8, wherein said wood fibers have an average length of from 0.2 to 5 mm, an average diameter of from 10 to 75 $\mu$m, and an average slenderness of from 40 to 120.

10. A process as claimed in claim 1, wherein gluing is conducted by swirling cellulosic fibers having a moisture content of from 0 to 150% in a stream of air or steam and spraying on glue solution (a), (b) or (c).

11. A process as claimed in claim 1, wherein compressing of the glued cellulosic fibers is performed by producing a fiber mat by scattering the glued cellulosic fibers onto a support and compressing said mat to a panel at temperatures of from 80 to 250° C. under pressures of from 5 to 50 bar.

12. A process as claimed in claim 1, wherein further to polyamine (P) or amino resin (b) or (c) the aqueous glue solution comprises paraffin wax.

13. A process as claimed in claim 1, wherein press tools having a smooth surface are used in step II.

14. A fiberboard panel comprising cellulosic fibers bound with polyamine (P) alone or with polyamine and with an amino resin (b) or with an amino resin (c) and having a smooth surface on both sides.

15. A fiberboard panel comprising cellulosic fibers bound with polyamine (P) alone or with polyamine and with an amino resin (b) or with an amino resin (c) and having a density of from 500 to 900 kg/m$^3$ and a thickness of from 6 to 40 mm.

16. An amino resin (c) synthesized from
- c1) formaldehyde (compound c1);
- c2) a compound (c2) selected from the group consisting of urea and melamine, the ratio of the amino groups of compound (c2) to formaldehyde being from 0.1:1 to 2.1;
- c3) a polyamine P, the molar ratio of the sum of primary, secondary, and tertiary amino groups of polyamine P to the sum of primary amino groups of compound (c2) being from 0.0005:1 to 2:1;
- c4) if desired, up to 0.2 mol per mole formaldehyde of another compound, (c4), capable of reacting with formaldehyde in a polycondensation reaction;
- c5) and, if desired, up to 0.2 mol per mole amino groups of compound (c2) of another compound, (c5), capable of reacting with amino groups in a polycondensation reaction;

and obtainable by
- in step 1, reacting an aqueous solution of formaldehyde;
  - amounts of compound (c2) such that the ratio of the amino groups of compound (c2) to formaldehyde is from 0.1:1 to 2.0:1;
  - amounts of polyamine (P) such that the molar ratio of the sum of the primary, secondary and tertiary amino groups of polyamine (P) to the sum of the primary amino groups of compound (c2) is from 0.0005:1 to 2:1; and
  - if desired, in amounts up to 0.2 mol per mole formaldehyde, of another compound (c4); and
  - if desired, in amounts up to 0.2 mol per mole amino groups of compound (c2), a compound (c5)
at a pH of from 2.5 to 8.5 and a temperature of from 50 to 100° C. until the solution has a viscosity of from 10 to 2000 mPas (measured at 20° C. on a solution having a solids content of 40%), and
- in step 2, where necessary, raising the pH to from 6 to 9 and, where necessary, adding urea in amounts such as to give the desired molar ratio of components (c1), (c2), (c3) and (c4) in the end product, and continuing to react the reaction mixture at a temperature of from 20 to 100° C. until the solution has a viscosity of from 20 to 2000 mPas (measured at 20° C. on a solution having a solids content of 40%).

17. A process as claimed in claim 6, wherein the amino resin (c) is obtained by in step 1, reacting an aqueous solution of formaldehyde;

amounts of compound (c2) such that the ratio of the amino groups of compound (c2) to formaldehyde is from 0.1:1 to 2.0:1;

amounts of polyamine P such that the molar ratio of the sum of the primary, secondary and tertiary amino groups of polyamine P to the sum of the primary amino groups of compound (c2) is from 0.0005:1 to 2:1; and if desired, up to 0.2 mol per mole formaldehyde of another compound (c4), if desired, in amounts up to 0.2 mol per mole amino groups of compound (c2), another compound (c5)

at a pH of from 2.5 to 8.5 and a temperature of from 50 to 100° C. until the solution has a viscosity of from 10 to 2000 mPas (measured at 20° C. on a solution having a solids content of 40%), and in step 2, where necessary, raising the pH to from 6 to 9 and, where necessary, adding urea in amounts such as to give the desired molar ratio of components (c1), (c2), (c3) and (c4) in the end product, and continuing to react the reaction mixture at a temperature of from 20 to 100° C. until the solution has a viscosity of from 10 to 2000 mPas (measured at 20° C. on a solution having a solids content of 40%).

18. A process as claimed in claim 8, wherein said wood fibers are those obtained by hydrothermally pulping woodchips and then defibering them.

19. An amino resin (c) as claimed in claim 16, wherein the amino resin (c) is obtained by in step 1, reacting an aqueous solution of formaldehyde;

amounts of compound (c2) such that the ratio of the amino groups of compound (c2) to formaldehyde is from 0.1:1 to 2.0:1;

amounts of polyamine (P) such that the molar ratio of the sum of the primary, secondary and tertiary amino groups of polyamine (P) to the sum of the primary amino groups of compound (c2) is from 0.0005:1 to 2:1; and if desired, in amounts up to 0.2 mol per mole formaldehyde, of another compound (c4); and if desired, in amounts up to 0.2 mol per mole amino groups of compound (c2), a compound (c5)

at a pH of from 2.5 to 8.5 and a temperature of from 50 to 100° C. until the solution has a viscosity of from 10 to 2000 mPas (measured at 20° C. on a solution having a solids content of 40%), and in step 2, where necessary, raising the pH to from 6 to 9 and, where necessary, adding urea in amounts such as to give the desired molar ratio of components (c1), (c2), (c3) and (c4) in the end product, and continuing to react the reaction mixture at a temperature of from 20 to 100° C. until the solution has a viscosity of from 20 to 2000 mPas (measured at 20° C. on a solution having a solids content of 40%).

* * * * *